United States Patent [19]
Geiszler et al.

[11] Patent Number: 6,157,952
[45] Date of Patent: Dec. 5, 2000

[54] METHOD AND APPARATUS FOR NETWORKED ACCESS CONTROL

[75] Inventors: Kenneth J. Geiszler, Campbell; Mark W. Lee; Robert D. Kohler, both of San Jose, all of Calif.

[73] Assignee: Keri Systems, Inc., San Jose, Calif.

[21] Appl. No.: 08/914,945

[22] Filed: Aug. 20, 1997

[51] Int. Cl.[7] ..................................... G06F 1/26
[52] U.S. Cl. .................. 709/224; 709/223; 709/224; 709/228; 709/217; 709/220; 709/222; 709/240; 395/750; 326/30; 340/825.31; 340/825.34; 713/300; 700/276
[58] Field of Search .................................. 709/222, 228, 709/200, 220, 224, 223, 217; 713/200, 202, 103, 300, 301; 340/825.31, 825.34; 700/276; 395/750; 326/30

[56] References Cited

U.S. PATENT DOCUMENTS

| | | | |
|---|---|---|---|
| 4,463,352 | 7/1984 | Forbes et al. | 340/825.05 |
| 4,546,241 | 10/1985 | Walton | 235/380 |
| 4,650,981 | 3/1987 | Foletta | 235/449 |
| 4,903,230 | 2/1990 | Kaplan et al. | 364/900 |
| 5,245,536 | 9/1993 | Hsieh | 364/408 |
| 5,491,471 | 2/1996 | Stobbe | 340/825.34 |
| 5,521,602 | 5/1996 | Carroll et al. | 342/50 |

FOREIGN PATENT DOCUMENTS

| | | | |
|---|---|---|---|
| 0 569 131 | 4/1993 | European Pat. Off. | G06K 19/07 |
| 0 758 777 | 2/1997 | European Pat. Off. | G07F 7/10 |
| 5-304531 | 11/1993 | Japan | H04L 12/40 |
| WO 95/01025 | 1/1995 | WIPO | H04L 12/40 |
| WO 96/08096 | 3/1996 | WIPO | H04L 12/40 |

OTHER PUBLICATIONS

"microID™ 125 kHz Design Guide–Using the microID™ Programmer", 1998, Microchip Technology, Inc., pp. 117–124.

CASIO 587 590 593.

*Primary Examiner*—Dung C. Dinh
*Assistant Examiner*—Hieu C. Le
*Attorney, Agent, or Firm*—D'Alessandro & Ritchie

[57] ABSTRACT

An access control device controller and method of operation are provided which provide in a first aspect of the invention, a novel way in which to set controller network addresses providing a visually perceivable digital readout to assist installers in setting the correct address, in a second aspect of the invention, automatic configuration of end of line termination resistors, line biasing resistors and earth ground connection to the network medium shield, in a third aspect of the invention, automatic configuration of a controller/host computer data communications link, in a fourth aspect of the invention, a novel method and apparatus for monitoring ambient RF noise levels, and in a fifth aspect of the invention, a novel method of detecting environmental conditions likely to lead to a system failure.

10 Claims, 5 Drawing Sheets

METHOD AND APPARATUS FOR NETWORKED ACCESS CONTROL

BACKGROUND OF THE INVENTION

1. Field of the Invention

The present invention relates to the field of networked access control devices.

2. The Background Art

Access control devices are known in the art. At their simplest level they consist of locks and keys used to control access to doors and the like. More recently networked access control devices have been developed which permit an entire system of access control to be controlled and maintained from a single point, such as a personal computer controller. Using such a networked access controller is a distinct improvement over prior technologies because of the ability to create a permanent record of access and egress including the identity of the person accessing and egressing as well as the time, the exact door or function accessed, and the like. Having a central control point allows easy re-keying of the system to add or delete authorized access.

In a typical access control situation, a door 10 as shown in FIG. 1 is equipped with a switch 12, typically a magnetically operated switch, which indicates if door 10 is open or closed. An electrically operated lock 14 controls access through the door. A magnetically coded card key 16 may be swept through a card key reader 18. If the card key 16 is valid, lock 14 will open permitting access through door 10. Alternatively, an RF proximity card reader or other type of access verification device may be used eliminating the need to sweep the card through the reader.

A typical network of access controllers is shown in FIG. 2. Master controller 20 is connected to slave controllers 22, 24 and 26 using a standard RS-485 network 28. The RS-485 network uses a shielded twisted pair (STP) medium such as Belden 9501 or equivalent. The RS-485 network 28 is a multipoint half-duplex differential data transmission network providing a capability of up to about 4000' or more of communication distance. It allows multiple nodes to communicate bidirectionally over a single twisted pair. In order to operate properly, each node on the network must have a unique address so that it will recognize messages sent to it.

Networked access systems as shown in FIG. 2 typically have one controller 20 designated as the master. This controller is located at one end of the RS-485 medium and is also connected to a host computer 30, either directly or through a modem 32. The host computer 30 runs software which allows an operator to configure and modify system parameters such as who is authorized to open which doors, hours of access, and the like. These parameters are then communicated over the RS-485 network to the various controllers 20, 22, 24, 26 which store the information on-board and operate relatively autonomously. The various controllers can transmit access event information back to the master 20 and then on to the host computer 30 which can display the information for use by an operator or record it for future use.

Turning to FIG. 3, a typical access controller 32 will have a connection 34 to the RS-485 network 36, a connection 38 to an access card key reader 40, proximity card key reader, or other access control device such as a keypad, or the like, a connection 42 to a door switch 44 indicating the status of the door, i.e., open or closed, a connection 46 to the door lock 48 or other device to be controlled, such as a parking lot gate arm, garage door, or the like, a connection 50 to a request to exit function 52 such as a button or proximity device used to permit egress when egress control is not required, a connection 54 to an alarm 56, if desired, to indicate an alarm condition such as attempted access or repeated attempted access with an invalid key, and optional connections 58 to optional devices 60 such as tamper detectors, additional access control devices, video surveillance devices and the like, as desired. Some controllers allow more than one door to be controlled from a single controller.

While present access control device controllers provide a good deal of functionality, they are very difficult to configure properly for installers in the field and a number of problems have been encountered in the field which have, in the past, caused difficulty in the installation process. In order to set the network address for known controllers, the field installer has to set a row of dip switches to the correct address desired for the controller. There is no indication of the address other than the state of the switches. If the switches are misconfigured, the installer has to go back to the controllers and check the dip switch configurations.

Similarly, the RS-485 network standard requires an end-of-line termination resistor across the differential conductor pair at the near and far end of the network medium. Typically each controller comes with the termination resistors on board to do this and they are placed in the circuit by the use of jumpers. Great difficulty has been experienced in the field in setting these jumpers to the correct position. If too many of the jumpers are left engaged, so that many controllers (more than one at each end of the network) are configured to apply their termination resistors across the conductors of the RS-485 medium, the network will become excessively loaded and will not operate reliably.

In order to insure proper operation of the network, it is desirable to bias the "+" and "−" conductors of the network medium through biasing resistors, the "+" side to Vcc (about +5 VDC) and the "−" side to ground. It is best to do this in a single place on the network. Using the jumper technology, frequently the network is loaded excessively with too many biasing resistors being active, or it is left biased in one direction only.

The shield of the network medium should be connected to earth ground at a single point. This provides the greatest immunity to noise. Since the prior art controllers provide a connection to earth ground via a jumper, it has been found that many installations have two or more connections of the shield to earth ground resulting in ground loops, noisy network connections and less than desirable system reliability.

Connecting the master controller to a computer has proved difficult in the past. Configuring switches and the like to tell the controller how it is to communicate with the computer has proved difficult in the field.

When using RF-type proximity card readers, ambient RF noise in the environment can disrupt the operation of the RF card reader. Without some way of detecting the presence of the noise, installers are frequently at a loss to explain why the entire system appears to be malfunctioning.

When installing controllers in locations subject to RF or induced currents, it is frequently difficult to diagnose problems caused by these environmental problems.

SUMMARY OF THE INVENTION

An access control device controller and method of operation are provided which provide in a first aspect of the invention, a novel way in which to set controller network addresses providing a visually perceivable digital readout to assist installers in setting the correct address, in a second aspect of the invention, automatic configuration of end of line termination resistors, line biasing resistors and earth ground connection to the network medium shield, in a third aspect of the invention, automatic configuration of a controller/host computer data communications link, in a fourth aspect of the invention, a novel method and apparatus for monitoring ambient RF noise levels, and in a fifth aspect of the invention, a novel method of detecting environmental conditions likely to lead to a system failure.

OBJECTS AND ADVANTAGES OF THE INVENTION

Accordingly, it is an object and advantage of the present invention to provide an improved method and apparatus for setting access control device controller network addresses.

It is a further object and advantage of the present invention to provide an improved method and apparatus for automatically configuring an access control device controller to have proper end of line termination resistor connections to the network medium, proper line biasing resistor connections to the network medium, and proper earth ground connections to the network medium shield at all nodes on the network.

It is a further object and advantage of the present invention to provide an automatically configured connection between the master access control device controller and a host computer.

It is a further object and advantage of the present invention to provide an improved method and apparatus for automatically alerting an operator to a communications failure between the host computer and the network of access control device controllers.

It is a further object and advantage of the present invention to provide a method and apparatus for monitoring RF signal levels to diagnose possible failure modes and interference problems.

Yet another object and advantage of the present invention is to provide a method of testing access control device controllers to detect environmental and/or interference problems.

These and many other objects and advantages of the present invention will become apparent to those of ordinary skill in the art from a consideration of the drawings and ensuing description of the invention.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Setting Controller Address

As discussed above, prior art access control device controllers used dip switches to set controller addresses. The present invention uses a single button in a presently preferred embodiment to accomplish all address setting. By pressing button 62, a momentary contact switch, for at least a predetermined period of time (or, alternatively, upon power-up of the controller), the controller will enter an address setting mode and the LED display 64 will become active providing a visually perceivable digital readout of the present controller address. In a presently preferred embodiment, the address range is 1–128, although it is possible to have more than 128 addresses as those of ordinary skill in the art will realize.

Quickly double clicking button 62 toggles between increasing and decreasing controller address. For example, when the switch is set to increment the current address when activated a single time, double activation within a first period of time, said first period of time being less than the amount of time necessary to cause two incremental advances of said current address with said double activation of said switch, causes subsequent switch activations to decrement the current address. The top LED character will display a "+" or "−" 66 to show which direction is active. A single click of button 62 changes the controller address by 1. If the controller address is at 128, a +1 click will roll the address over to 1. If the controller address is at 1, a −1 click will roll the address over to 128. Pressing and holding button 62 rapidly scrolls through the addresses. To conserve power, the address display will turn off after one minute of inactivity of button 62 (conversely, pressing button 62 resets an inactivity countdown timer). The address is then stored within system memory, preferably in non-volatile memory such as EEPROM or battery-backed-up RAM, when the microprocessor of the controller detects the changed address after the address setting mode is exited.

Pressing button 62 will preferably turn the display back on to view the current controller address and cause the controller to re-enter the address setting mode.

In accordance with a presently preferred embodiment of the present invention, this function is managed by a conventional RISC microcontroller.

Automatic Configuration of Network

Figure 1:
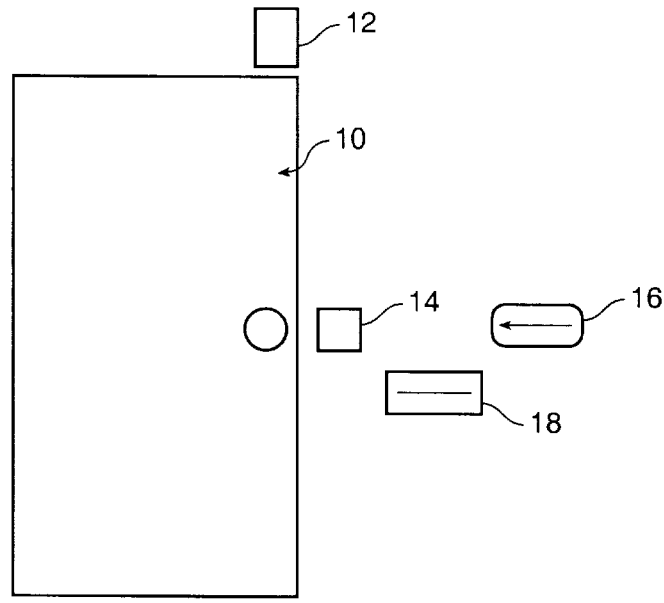
FIG. 1 is a schematic diagram of a door and associated devices for controlling access to the door.
Figure 2:
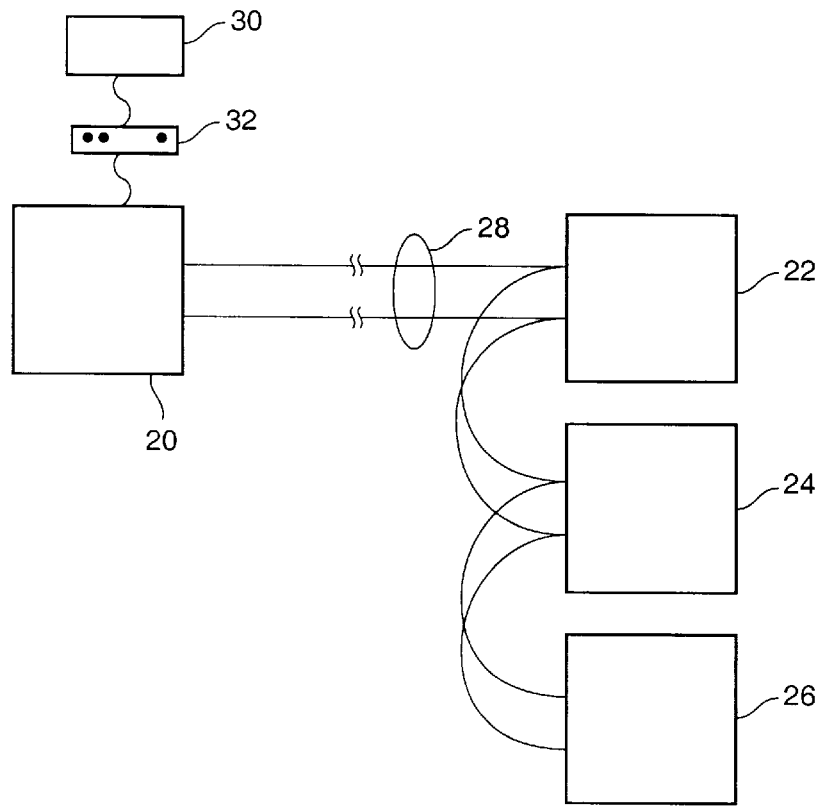
FIG. 2 is a block diagram of a typical access control device controller network.
Figure 3:
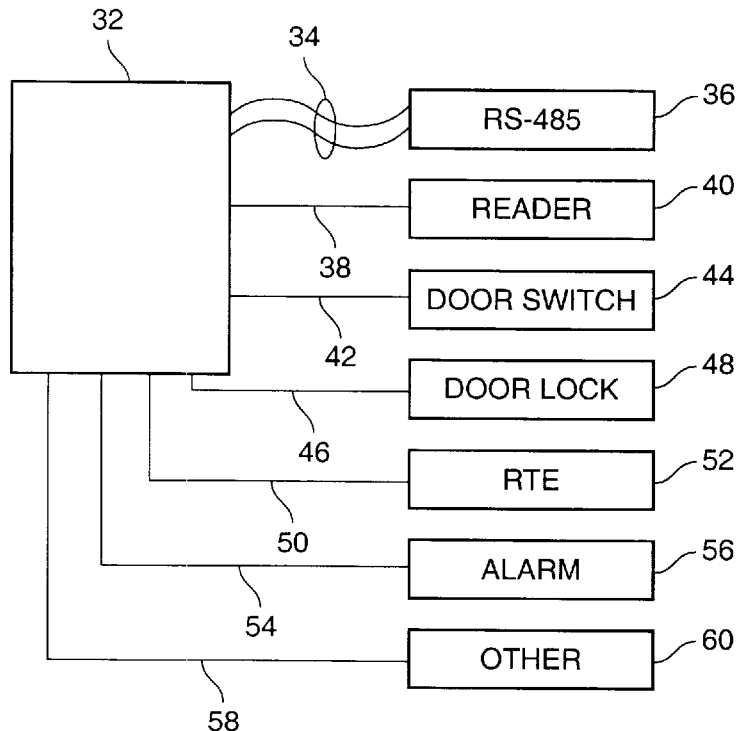
FIG. 3 is a diagram showing typical connections to an access control device controller.
Figure 4A:
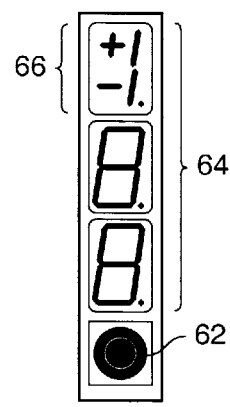
FIG. 4a is a drawing showing an address display in accordance with a presently preferred embodiment of the present invention.
Figure 4B:
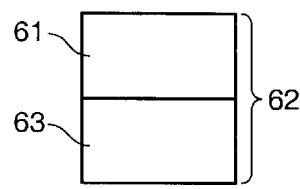
FIG. 4b is a diagram showing the two modes of the address display switch.
Figure 5:
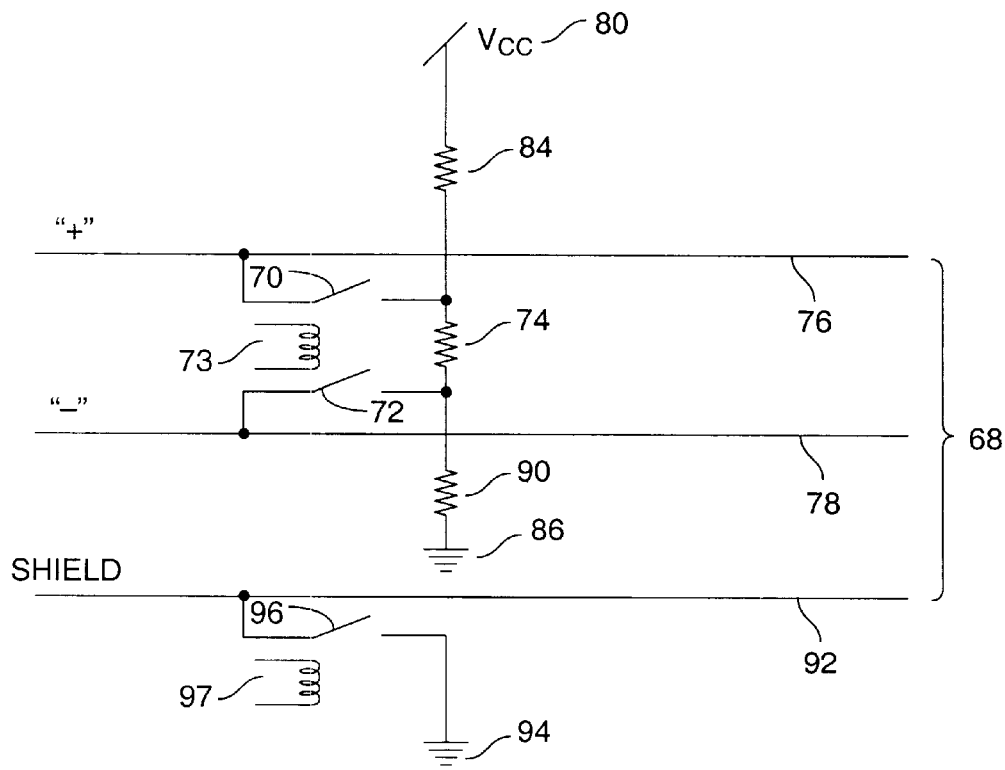
FIG. 5 is a schematic diagram showing connections between the master controller and the network medium in accordance with a presently preferred embodiment of the present invention.

Turning now to FIG. 5, in order to configure the network medium 68 correctly, a number of electrical connections need to be made. In the past, these connections were made with jumpers installed or set by installers in the field. As discussed above, these manually programmed jumpers were easily mis-programmed in the past. According to a presently preferred embodiment of the present invention, these connections are all now made automatically.

The first connection of concern is the end of line termination resistors. In the RS-485 network specification, it is necessary to put a single 100–120 ohm resistor between the "+" line and "−" line of the RS-485 medium at each end of the network. Because the characteristic impedance of the medium is around 100–120 ohms, this acts as a perfect terminating load so that little or no signal is reflected from the end of the network medium. While this is an ideal situation, and necessary for maximum speeds on the network approaching 10 Megabits/second, it is not required for the present application. In accordance with the present invention, a data speed of 9600 baud is preferably used for network serial data communication giving a bit time of about 100 microseconds. Since the overall network length is generally limited by RS-485 to 4000 feet, although longer distances are possible, the bit time is much greater than the time it takes to propagate a signal up and down the maximum length of the network medium (approximately 8 microseconds). Thus, as long as the network is terminated at one end, there is plenty of time for the signal to settle. Accordingly, the master unit is defined as any controller on the network with an address of "1". Each controller should have a unique address on the network. The master and slave controllers may be identical in form. However, the master, because it knows its address is "1" therefore closes contacts 70 and 72 of relay 73 (or achieves the connection in an electrically equivalent manner) to place end of line termination resistor 74 between "+" line 76 and "−" line 78. In this way, because there is only one master controller on the network, there can be only one termination and it will by definition automatically be set correctly thus avoiding the problem of either having no termination or too many terminations thus loading the network unnecessarily.

The second connection of concern is the use of network biasing to provide a known state in the event that all drivers are tri-state, i.e., off. In accordance with standard engineering practice, a 500–700 ohm resistor is typically used to connect the "−" line 78 to system ground 86 and the "+" line 76 to Vcc 80 (typically +5 VDC). In the past this was done with jumpers and problems arose where the network was biased at multiple points, or not at all. As above, this problem may now be solved automatically at the master controller. Since it is only necessary and desired to bias the network at one place, this is performed in a presently preferred embodiment of the present invention at the controller having the address of the master. Although all controllers on the network may have this capability, only the one with the address of "1" will assert it. In accordance with this invention Vcc 80 is connected through biassing resistor 84 and relay contacts 70 of relay 73 to "+" line 76. Similarly, system ground 86 (not earth ground) is connected through biassing resistor 90 and relay contacts 72 of relay 73 to "−" line 78. While a DPDT relay is used here, many other connection schemes could be used as well as would be apparent to those of ordinary skill in the art. In this way, because only one master controller is present on the network, problems of under- or over-biasing will be avoided.

The third connection of concern is the connection between the shield of the shielded twisted pair network medium 68 used for the network and earth ground 94. Shield 92 is present at each node of the network. An earth ground 94 is present at each node in the network. This is typically obtained by connecting a wire to a ground rod, a cold water (metal) pipe, a steel building frame, the electrical system ground at the breaker box, or the telephone system ground. In the past, some installers have connected earth ground at each controller to the shield. This results in ground loops and reduced system immunity to interference of various types. To avoid this problem, and to insure that a single connection to earth ground 94 is provided, the master controller is again used to provide the single needed connection.

In accordance with a presently preferred embodiment of the present invention, a single earth ground connection is made at the master controller by having the master controller make a connection through contacts 96 of relay 97 in response to the controller having an address of "1" (i.e., being the single 'master' controller on the network). Relay 97 then connects earth ground 94 to shield 92 at a single point as desired, thus avoiding ground loops and providing desired interference immunity. While a relay is used here, other connection schemes could be used as well as would be appreciated by those of ordinary skill in the art.

Automatic Configuration of Host Computer Communications Link

Figure 6:
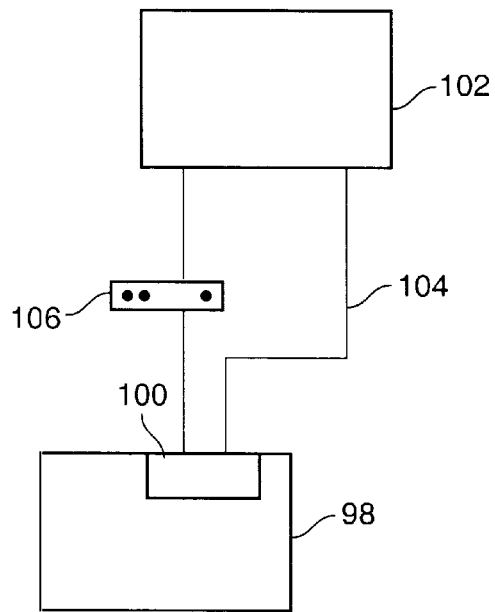
FIG. 6 is a block diagram showing connections between a master controller and a host computer according to a presently preferred embodiment of the present invention.

Turning now to FIG. 6, the controllers 98, including the master controller preferably have an RS-232 serial port 100 for communication with a host computer 102 such as a conventional personal computer. The host computer may be provided with access control software such as "Doors™" available from Keri Systems Incorporated of San Jose, Calif. In the past, configuring a controller to know whether it was directly connected to the computer as at connection 104 or connected through a modem 106 has proved difficult in the field. The difference is important because the controller 98 needs to generate different signals to communicate under the different connections.

Figure 7:
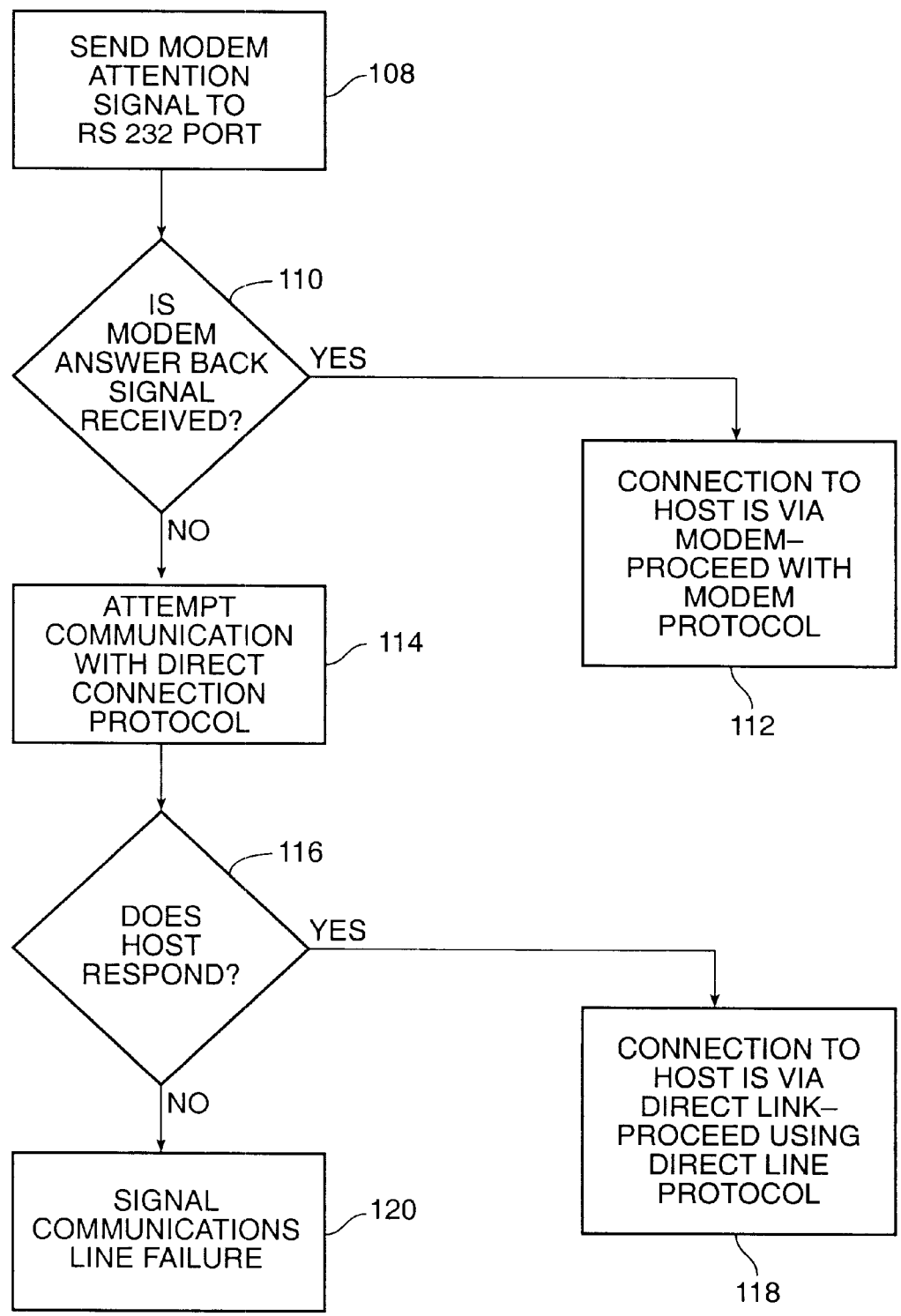
FIG. 7 is a flow chart of a method used in accordance with a presently preferred embodiment of the present invention to determine the type of communications link present between a master controller and a host computer.

In accordance with a presently preferred embodiment of the present invention, this problem is solved as shown in the flow chart of FIG. 7. At block 108 the controller 98 attempts to make a connection with the host computer 102 by sending the modem attention signal AT over the RS-232 port 100. If a modem is present, it should answer back in a conventional manner. At block 110, if the answer back is received, the controller 98 can now safely assume that it is connected to a modem as at 112. If no answer back signal is received, the controller 98 attempts at block 114 to communicate with the host computer 102 using a direct connection protocol over the RS-232 port 100. If the host computer answers the query at block 116, then communication proceeds in the direct mode as at block 118, otherwise, at block 120, the controller 98 signals a communications failure—this is preferably done by setting a bit or writing a message to an optional diagnostic panel.

Monitoring RF Signal Levels

Figure 8:
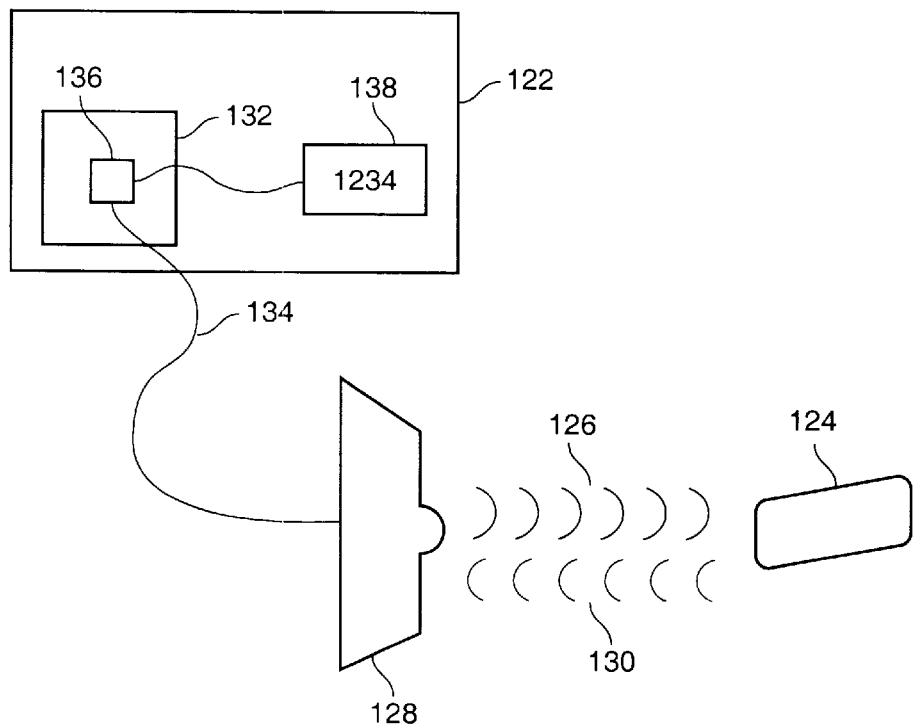
FIG. 8 is a schematic diagram of an RF proximity ID card reading system employing the controller of the present invention and an RF digital voltage readout.

Turning now to FIG. 8, the controller 122 of the present invention is intended to be used with a number of different types of access control devices. These include industry standard Wiegand magnetic card readers, RF proximity cards 124 where a first RF signal 126, typically at about 125 kHz is transmitted by the reader 128, received by a card 124, frequency divided to about 62.5 kHz and modulated by the card with a security ID number, and transmitted as a second RF signal 130 which is received by the card reader 128, and other types of access control devices. The exact access control device interface is preferably on an interface card 132 which plugs into the controller 122. Where RF devices are used, occasionally there may be a problem due to environmental interference, such as from personal computer monitors, fluorescent lighting, and other sources of RF signals. In the past it has been difficult to diagnose these problems because the system appeared to either work or not work and complex RF voltage measuring equipment was not ordinarily part of each installers tool kit.

In order to more readily diagnose RF related problems associated with RF type card readers, the present invention brings the receive RF line 134 into the controller and applies it to an analog to digital converter 136 after band pass filtering to limit response to the desired frequency band. This provides a relative digital voltage value which is consistent among controllers of a particular type and allows quick diagnosis of ambient RF overload problems. The installer can read the digital voltage value directly with an optional LCD display 138 which plugs into the controller 122 and determine if the ambient reading exceeds a threshold which would require further action such as relocation of the RF head 128, or RF interference attenuation of an offending device.

Off-line Cycle Testing

Figure 9:
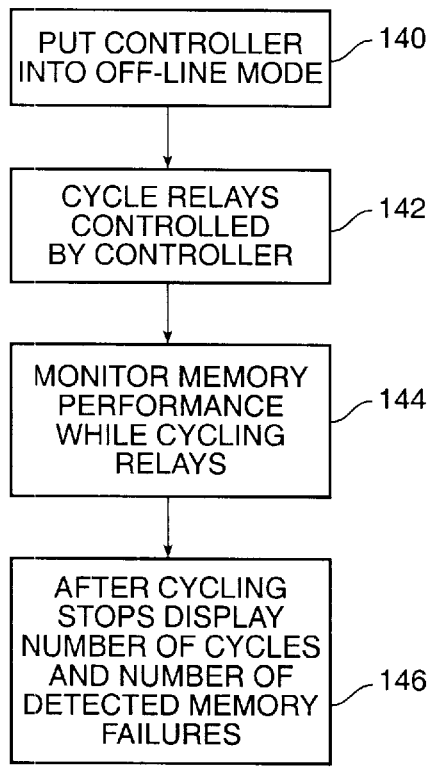
FIG. 9 is a flow chart of a method used to cycle the controller off line to detect any memory failures which occur during cycling.

In some situations it is possible to encounter hardware configurations which result in intermittent failures of the controller. One situation typically encountered is where the controller is used to control a parking lot gate or an elevator. These devices, when turned on, can cause transient voltages to be induced on lines going to the controller such as power, control lines, and the like. While these can occasionally cause immediate damage to the controller, more often they result in intermittent memory errors which result in strange behavior on the part of the controller. In order to verify that these problems do not exist, a method of testing the controller after installation is provided. Turning to the flow chart at FIG. 9, first, at block 140 the controller is placed in an off line condition. Then the various relays controlled by the controller are cycled for a period of time at block 142. This might include driving the parking gate up and down overnight, for example. Memory checksums are examined at block 144 while the cycling continues and any errors are reported along with the number of cycles carried out at block 146. If no checksum errors are detected, then the system is considered to be operating correctly. If errors are detected, then the installer would typically attempt to isolate the controller from the transients by using standard transient suppression techniques such as by placing transorb devices, bypass capacitors and ferrite beads in the lines to and from the controller.

Alternative Embodiments

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims.

What is claimed is:

1. An access control device controller comprising:
   communicating means for communicating data over a network, said communicating means including a first line and a second line, said communicating means requiring each access control device controller on said network to have a unique address;
   address setting means for setting a unique address on the access control device controller, said means including
   (a) a visually perceivable digital readout mounted to the access control device controller for displaying a digital readout indicating a current address of the access control device controller; and
   (b) a switch for causing said current address of the access control device controller to change, said switch capable of setting a selected address indicating that the access control device controller is a master controller;
   a first means responsive to the access control device being a master controller for activating a circuit to connect an end of line termination resistor across said first line and said second line at the master controller; and
   a second means responsive to the access control device being a master controller for activating a circuit to connect a first power supply level through a first resistor to said first line and a second power supply level, different from said first power supply level, through a second resistor to said second line at the master controller.

2. An access control device controller according to claim 1 further comprising enabling means for entering an address setting mode of the access control device controller in response to activation of a circuit within the access control device controller, said enabling means disabling said digital readout after expiration of a first period of time following last activation of said circuit.

3. An access control device controller according to claim 2 wherein said switch normally increments the current address when activated a single time, but when double activated within a first period of time, said first period of time being less than the amount of time necessary to cause two incremental advances of said current address with said double activation of said switch, causes subsequent switch activations to decrement the current address.

4. An access control device controller according to claim 1 wherein said first resistor and said second resistor have similar values of resistance.

5. An access control device controller capable of communicating over a shielded twisted pair network medium, said shielded twisted pair network medium including a first line, a second line and a shield, said access control device controller comprising:
   communicating means for communicating data over a network, said communicating means including a first line for connection to said first line of said twisted pair network medium and a second line for connection to said second line of said twisted pair network medium, said communicating means requiring each access control device controller on said network to have a unique address;
   address setting means for setting a unique address on the access control device controller, said means including
   (a) a visually perceivable digital readout mounted to the access control device controller for displaying a digital readout indicating a current address of the access control device controller; and
   (b) a switch for causing said current address of the access control device controller to change, said switch capable of setting a selected address indicating that the access control device controller is a master controller; and
   a circuit which, only if the access control device controller is a master controller, connects an earth ground connection present on the access control device controller to the shield of the shielded twisted pair network medium.

6. A method of operating an access control device controller for use on a network including a medium having a first line, a second line and a shield, said method comprising the steps of:
   determining if a circuit within the access control device controller has been activated and if activated, entering an address setting mode for a first period of time, said first period of time resetting upon each subsequent activation of said circuit;

setting a network address of the access control device controller to a predetermined value upon first entering said address setting mode;

displaying said network address on a visually perceivable digital readout on said access control device controller while in said address setting mode;

accepting a switch input to increment or decrement said network address while in said address setting mode;

leaving said address setting mode at the expiration of said first period of time, thereby setting a network address for the access control device controller;

determining if said network address is an address corresponding to a master controller, and if so, activating a circuit to connect an end of line termination resistor across said first line and said second line; and activating a circuit to connect a first power supply level through a first resistor to said first line and a second power supply level different from said first power supply level, through a second resistor to said second line if said network address of the access control device controller corresponds to a master controller.

7. A method in accordance with claim 6 further comprising:

activating a circuit to connect an earth ground connection present on the access control device controller to the shield of the shielded twisted pair network medium if said network address of the access control device controller corresponds to a master controller.

8. A method in accordance with claim 6, wherein the access control device controller has the capability of being connected to a host computer over a communications link for transfer of information between said access control device controller and said host computer, said method further comprising:

transmitting from the access control device controller a modem attention signal over the communications link;

determining whether a modem-type connection or a direct-type connection is present between the access control device controller and the host computer by monitoring the data communications link to determine if a modem answerback signal is received by the access control device controller over the communications link and if it is not, determining that a direct connection is present;

using a modem protocol to communicate over the communication link where it has been determined that a modem is present; and using a direct data protocol to communicate over the communications link where it has been determined that a direct connection is present.

9. A method according to claim 8, further comprising:

monitoring the communications link for a data communications failure; and communicating the detection of a data communications failure.

10. An access control device controller comprising:

communicating means for communicating data over a network, said communicating means including a first line and a second line, said communicating means requiring each access control device controller on said network to have a unique address;

address setting means for setting a unique address on the access control device controller, said means including (a) a visually perceivable digital readout mounted to the access control device controller for displaying a digital readout indicating a current address of the access control device controller; and (b) a switch for causing said current address of the access control device controller to change, said switch capable of setting a selected address indicating that the access control device controller is a master controller; and a means responsive to the access control device being a master controller for activating a circuit to connect a first power supply level through a first resistor to said first line and a second power supply level, different from said first power supply level, through a second resistor to said second line at the master controller.

* * * * *

UNITED STATES PATENT AND TRADEMARK OFFICE
CERTIFICATE OF CORRECTION

PATENT NO. : 6,157,952
DATED : December 5, 2000
INVENTOR(S) : Geiszler et al.

It is certified that error appears in the above-identified patent and that said Letters Patent is hereby corrected as shown below:

Column 6,
Line 22, after "controller" add -- , --.

Column 10,
Line 4, after "link" add -- , --.

Signed and Sealed this

Twenty-first Day of January, 2003

JAMES E. ROGAN
*Director of the United States Patent and Trademark Office*